(12) United States Patent
Catherwood

(10) Patent No.: US 7,020,788 B2
(45) Date of Patent: Mar. 28, 2006

(54) REDUCED POWER OPTION

(75) Inventor: Michael I. Catherwood, Massachusetts, MA (US)

(73) Assignee: Microchip Technology Incorporated, Chandler, AZ (US)

( * ) Notice: Subject to any disclaimer, the term of this patent is extended or adjusted under 35 U.S.C. 154(b) by 743 days.

(21) Appl. No.: 09/870,772

(22) Filed: Jun. 1, 2001

(65) Prior Publication Data

US 2003/0126484 A1 Jul. 3, 2003

(51) Int. Cl.
*G06F 1/32* (2006.01)

(52) U.S. Cl. .................. 713/322; 713/501; 713/601
(58) Field of Classification Search ............ 713/300, 713/320, 322, 500, 501, 600, 601; 712/43, 712/229
See application file for complete search history.

(56) References Cited

U.S. PATENT DOCUMENTS

| | | | |
|---|---|---|---|
| 3,771,146 A | 11/1973 | Cotton et al. | 710/260 |
| 3,781,810 A | 12/1973 | Downing | 340/172.5 |
| 3,886,524 A | 5/1975 | Appelt | 710/110 |
| 3,930,253 A | 12/1975 | Maida | 340/347 |
| 4,025,771 A | 5/1977 | Lynch et al. | 708/521 |
| 4,074,353 A | 2/1978 | Woods et al. | 710/264 |
| 4,090,250 A | 5/1978 | Carlson et al. | 712/234 |
| 4,323,981 A | 4/1982 | Nakamura | 364/749 |
| 4,379,338 A | 4/1983 | Nishitani et al. | 708/552 |
| 4,398,244 A | 8/1983 | Chu et al. | 364/200 |
| 4,408,274 A | 10/1983 | Wheatley et al. | 364/200 |
| 4,451,885 A | 5/1984 | Gerson et al. | 708/200 |
| 4,472,788 A | 9/1984 | Yamazaki | 364/900 |

(Continued)

FOREIGN PATENT DOCUMENTS

| | | |
|---|---|---|
| EP | 0 554 917 A2 | 8/1993 |
| EP | 0 855 643 A1 | 7/1998 |
| EP | 0 992 888 | 12/2000 |
| EP | 0 992 889 | 12/2000 |
| JP | 01037424 A | 2/1989 |
| WO | 96/11443 | 4/1996 |

OTHER PUBLICATIONS

Moon B I et al.: "A 32–bit RISC Microprocessor with DSP Functionality: Rapid Prototyping" IEICE Transactions on Fundamentals of Electronics, Communications and Computer Sciences, Institute of Electronics Information and Comm. Eng. Tokyo, JP, vol. E84–A No. 5, pp. 1339–1347, XP001060025 ISSN: 0916–8508, May 2001.

Turley J: "Balancing Conflicting Requirements When Mixing RISC, DSPs" Computer Design, Pannwell Publ. Littleton, Massachusetts, IS, vol. 37, No. 10, pp. 46, 48, 50–53, XP000860706 ISSN:0010–4566, Oct. 1998.

Levy M: "Microprocessor and DSP Technologies Unite for Embedded Applications" EDN Electrical Design News, Cahners Publishing Co., Newton Massachusetts, US, No. Europe, pp. 73–74, 76, 78–80, XP000779113 ISSN: 0012–7515, Mar. 2, 1998.

(Continued)

*Primary Examiner*—Dennis M. Butler
(74) *Attorney, Agent, or Firm*—Baker Botts L.L.P.

(57) ABSTRACT

A method and a processor for processing a power mode instruction are provided. The power mode instruction itself includes up to five different sleep modes and one run mode, each for initiating a clock source change or inhibit. This instruction may be executed in one processor cycle and with one power mode instruction employing clock transition logic within the processor to initiate a switch to the clock source configuration specified by a literal, such as a 3-bit literal. Operand may be written the register of clock transition logic to define an exit state for a sleep mode.

33 Claims, 6 Drawing Sheets

U.S. PATENT DOCUMENTS

| | | | |
|---|---|---|---|
| 4,481,576 A | 11/1984 | Bicknell | 364/200 |
| 4,488,252 A | 12/1984 | Vassar | 346/748 |
| 4,511,990 A | 4/1985 | Hagiwara et al. | 364/748 |
| 4,556,938 A | 12/1985 | Parker et al. | 364/200 |
| 4,615,005 A * | 9/1986 | Maejima et al. | 713/601 |
| 4,626,988 A | 12/1986 | George | 364/200 |
| 4,709,324 A | 11/1987 | Kloker | 364/200 |
| 4,730,248 A | 3/1988 | Watanabe et al. | |
| 4,742,479 A | 5/1988 | Kloker et al. | 364/746 |
| 4,768,149 A | 8/1988 | Konopik et al. | 364/200 |
| 4,779,191 A | 10/1988 | Greenblatt | 711/2 |
| 4,782,457 A | 11/1988 | Cline | 364/715.04 |
| 4,800,524 A | 1/1989 | Roesgen | 364/900 |
| 4,807,172 A | 2/1989 | Nukiyama | 364/715.08 |
| 4,829,420 A | 5/1989 | Stahle | 364/200 |
| 4,829,460 A | 5/1989 | Ito | 364/715.08 |
| 4,839,846 A | 6/1989 | Hirose et al. | 364/748 |
| 4,841,468 A | 6/1989 | Miller et al. | 708/625 |
| 4,872,128 A | 10/1989 | Shimizu | 364/715.08 |
| 4,882,701 A | 11/1989 | Ishii | 364/900 |
| 4,926,371 A | 5/1990 | Vassiliadis et al. | 708/628 |
| 4,941,120 A | 7/1990 | Brown et al. | 364/748 |
| 4,943,940 A | 7/1990 | New | |
| 4,945,507 A | 7/1990 | Ishida et al. | 708/530 |
| 4,959,776 A | 9/1990 | Deerfield et al. | |
| 4,977,533 A | 12/1990 | Miyabayashi et al. | |
| 4,984,213 A | 1/1991 | Abdoo et al. | |
| 5,007,020 A | 4/1991 | Inskeep | |
| 5,012,441 A | 4/1991 | Retter | |
| 5,032,986 A | 7/1991 | Pathak et al. | |
| 5,034,887 A | 7/1991 | Yasui et al. | 364/200 |
| 5,038,310 A | 8/1991 | Akagiri et al. | |
| 5,040,178 A | 8/1991 | Lindsay et al. | 371/21.5 |
| 5,056,004 A | 10/1991 | Ohde et al. | |
| 5,099,445 A | 3/1992 | Studor et al. | |
| 5,101,484 A | 3/1992 | Kohn | |
| 5,117,498 A | 5/1992 | Miller et al. | |
| 5,121,431 A | 6/1992 | Wiener | 713/174 |
| 5,122,981 A | 6/1992 | Taniguchi | |
| 5,155,823 A | 10/1992 | Tsue | |
| 5,177,373 A | 1/1993 | Nakamura | 307/265 |
| 5,197,023 A | 3/1993 | Nakayama | |
| 5,197,140 A | 3/1993 | Balmer | |
| 5,206,940 A | 4/1993 | Murakami et al. | |
| 5,212,662 A | 5/1993 | Cocanougher et al. | |
| 5,239,654 A | 8/1993 | Ing-Simmons et al. | 395/800 |
| 5,276,634 A | 1/1994 | Suzuki et al. | |
| 5,282,153 A | 1/1994 | Bartkowiak et al. | |
| 5,327,543 A | 7/1994 | Miura et al. | |
| 5,327,566 A | 7/1994 | Forsyth | |
| 5,375,080 A | 12/1994 | Davies | 364/736.5 |
| 5,379,240 A | 1/1995 | Byrne | |
| 5,386,563 A | 1/1995 | Thomas | 395/650 |
| 5,392,435 A | 2/1995 | Masui et al. | 395/725 |
| 5,418,976 A | 5/1995 | Iida | 395/800 |
| 5,422,805 A | 6/1995 | McIntyre et al. | 708/625 |
| 5,432,943 A | 7/1995 | Mitsuishi | 395/725 |
| 5,448,703 A | 9/1995 | Amini et al. | |
| 5,448,706 A | 9/1995 | Fleming et al. | |
| 5,450,027 A | 9/1995 | Gabara | 326/98 |
| 5,463,749 A | 10/1995 | Wertheizer et al. | |
| 5,469,377 A | 11/1995 | Amano | |
| 5,471,600 A | 11/1995 | Nakamoto | |
| 5,497,340 A | 3/1996 | Uramoto et al. | |
| 5,499,380 A | 3/1996 | Iwata et al. | |
| 5,504,916 A | 4/1996 | Murakami et al. | 395/800 |
| 5,506,484 A | 4/1996 | Munro et al. | 318/599 |
| 5,517,436 A | 5/1996 | Andreas et al. | 364/736 |
| 5,525,874 A | 6/1996 | Mallarapu et al. | 318/254 |
| 5,548,544 A | 8/1996 | Matheny et al. | |
| 5,561,384 A | 10/1996 | Reents et al. | 327/108 |
| 5,561,619 A | 10/1996 | Watanabe et al. | 364/736.5 |
| 5,564,028 A | 10/1996 | Swoboda et al. | 395/375 |
| 5,568,380 A | 10/1996 | Broadnax et al. | 364/184 |
| 5,568,412 A | 10/1996 | Han et al. | 364/748 |
| 5,596,760 A | 1/1997 | Ueda | 395/588 |
| 5,600,813 A | 2/1997 | Nakagawa et al. | 395/421.07 |
| 5,611,061 A | 3/1997 | Yasuda | 395/591 |
| 5,619,711 A | 4/1997 | Anderson | 395/800 |
| 5,623,646 A | 4/1997 | Clarke | 395/560 |
| 5,638,524 A | 6/1997 | Kiuchi et al. | 395/375 |
| 5,642,516 A | 6/1997 | Hedayat et al. | 395/733 |
| 5,649,146 A | 7/1997 | Riou | 395/421.07 |
| 5,651,121 A | 7/1997 | Davies | 395/376 |
| 5,657,484 A | 8/1997 | Scarrá | 395/561 |
| 5,659,700 A | 8/1997 | Chen et al. | 395/421.07 |
| 5,682,339 A | 10/1997 | Tam | 364/715.08 |
| 5,689,693 A | 11/1997 | White | 395/565 |
| 5,694,350 A | 12/1997 | Wolrich et al. | 364/788 |
| 5,696,711 A | 12/1997 | Makineni | 364/748.03 |
| 5,701,493 A | 12/1997 | Jaggar | 395/734 |
| 5,706,460 A | 1/1998 | Craig et al. | 395/380 |
| 5,706,466 A | 1/1998 | Dockser | 395/452 |
| 5,715,470 A | 2/1998 | Asano et al. | 395/800 |
| 5,737,570 A | 4/1998 | Koch | 395/872 |
| 5,740,095 A | 4/1998 | Parant | 364/760 |
| 5,740,419 A | 4/1998 | Potter | 395/588 |
| 5,740,451 A | 4/1998 | Muraki et al. | 395/733 |
| 5,748,516 A | 5/1998 | Goddard et al. | |
| 5,748,970 A | 5/1998 | Miyaji et al. | 395/733 |
| 5,764,555 A | 6/1998 | McPherson et al. | 364/748.03 |
| 5,765,216 A | 6/1998 | Weng et al. | 711/214 |
| 5,765,218 A | 6/1998 | Ozawa et al. | 711/219 |
| 5,774,711 A | 6/1998 | Henry et al. | 395/591 |
| 5,778,237 A * | 7/1998 | Yamamoto et al. | 713/322 |
| 5,778,416 A | 7/1998 | Harrison et al. | 711/5 |
| 5,790,443 A | 8/1998 | Shen et al. | 364/746 |
| 5,808,926 A | 9/1998 | Gorshtein et al. | 364/748.11 |
| 5,812,439 A | 9/1998 | Hansen | 364/748.03 |
| 5,812,868 A | 9/1998 | Moyer et al. | 395/800.23 |
| 5,815,693 A * | 9/1998 | McDermott et al. | 713/501 |
| 5,825,730 A | 10/1998 | Nishida et al. | 369/44.32 |
| 5,826,072 A | 10/1998 | Knapp et al. | 395/567 |
| 5,826,096 A | 10/1998 | Baxter | 395/800.24 |
| 5,828,875 A | 10/1998 | Halvarsson et al. | 395/588 |
| 5,862,065 A | 1/1999 | Muthusamy | 364/736.5 |
| 5,867,726 A | 2/1999 | Ohsuga et al. | 395/800.32 |
| 5,875,342 A | 2/1999 | Temple | 395/733 |
| 5,880,984 A | 3/1999 | Burchfiel et al. | 364/748.07 |
| 5,892,697 A | 4/1999 | Brakefield | 364/748.02 |
| 5,892,699 A | 4/1999 | Duncan et al. | 364/760.4 |
| 5,894,428 A | 4/1999 | Harada | 364/724.03 |
| 5,900,683 A | 5/1999 | Rinehart et al. | 307/126 |
| 5,909,385 A | 6/1999 | Nishiyama et al. | 364/760.03 |
| 5,917,741 A | 6/1999 | Ng | 364/748.03 |
| 5,918,252 A | 6/1999 | Chen et al. | 711/217 |
| 5,930,159 A | 7/1999 | Wong | 364/745.01 |
| 5,930,503 A | 7/1999 | Drees | 395/651 |
| 5,936,870 A | 8/1999 | Im | 364/745.03 |
| 5,937,199 A | 8/1999 | Temple | 395/335 |
| 5,938,759 A | 8/1999 | Kamijo | 712/209 |
| 5,941,940 A | 8/1999 | Prasad et al. | 708/523 |
| 5,943,249 A | 8/1999 | Handlogten | 364/748.02 |
| 5,944,816 A | 8/1999 | Dutton et al. | 712/215 |
| 5,951,627 A | 9/1999 | Kiamilev et al. | 708/404 |
| 5,951,679 A | 9/1999 | Anderson et al. | 712/241 |
| 5,973,527 A | 10/1999 | Schweighofer et al. | 327/172 |
| 5,974,549 A | 10/1999 | Golan | 713/200 |
| 5,978,825 A | 11/1999 | Divine et al. | 708/525 |
| 5,983,333 A | 11/1999 | Kolagotla et al. | 711/219 |
| 5,991,787 A | 11/1999 | Abel et al. | 708/400 |

| | | | |
|---|---|---|---|
| 5,991,868 A | 11/1999 | Kamiyama et al. | 712/32 |
| 5,996,067 A | 11/1999 | White | 712/224 |
| 6,002,234 A | 12/1999 | Ohm et al. | 318/729 |
| 6,009,454 A | 12/1999 | Dummermuth | 709/108 |
| 6,014,723 A | 1/2000 | Tremblay et al. | 711/1 |
| 6,018,757 A | 1/2000 | Wong | 708/525 |
| 6,026,489 A | 2/2000 | Wachi et al. | 712/241 |
| 6,044,392 A | 3/2000 | Anderson et al. | 708/551 |
| 6,044,434 A | 3/2000 | Oliver | 711/110 |
| 6,049,858 A | 4/2000 | Kolagotla et al. | 711/217 |
| 6,055,619 A | 4/2000 | North et al. | 713/36 |
| 6,058,409 A | 5/2000 | Kozaki et al. | 708/409 |
| 6,058,410 A | 5/2000 | Sharangpani | 708/551 |
| 6,058,464 A | 5/2000 | Taylor | 711/217 |
| 6,061,711 A | 5/2000 | Song et al. | 709/108 |
| 6,061,780 A | 5/2000 | Shippy et al. | 712/204 |
| 6,061,783 A | 5/2000 | Harriman | 712/224 |
| 6,076,154 A | 6/2000 | Van Eijndhoven et al. | 712/24 |
| 6,084,880 A | 7/2000 | Bailey et al. | 370/395 |
| 6,101,521 A | 8/2000 | Kosiec | 708/550 |
| 6,101,599 A | 8/2000 | Wright et al. | 712/228 |
| 6,115,732 A | 9/2000 | Oberman et al. | 708/625 |
| 6,128,728 A | 10/2000 | Dowling | 712/228 |
| 6,134,574 A | 10/2000 | Oberman et al. | 708/551 |
| 6,144,980 A | 11/2000 | Oberman | 708/627 |
| 6,145,049 A | 11/2000 | Wong | 710/267 |
| 6,181,151 B1 | 1/2001 | Wasson | 324/765 |
| 6,202,163 B1 * | 3/2001 | Gabzdyl et al. | 713/324 |
| 6,205,467 B1 | 3/2001 | Lambrecht et al. | 709/108 |
| 6,209,086 B1 | 3/2001 | Chi et al. | 712/244 |
| 6,243,786 B1 | 6/2001 | Huang et al. | 710/262 |
| 6,243,804 B1 | 6/2001 | Cheng | 712/228 |
| 6,260,162 B1 | 7/2001 | Typaldos et al. | 714/34 |
| 6,282,637 B1 | 8/2001 | Chan et al. | 712/223 |
| 6,292,866 B1 | 9/2001 | Zaiki et al. | 710/264 |
| 6,295,574 B1 | 9/2001 | MacDonald | 710/261 |
| 6,315,200 B1 | 11/2001 | Silverbrook et al. | 235/454 |
| 6,356,970 B1 | 3/2002 | Killian et al. | 710/269 |
| 6,377,619 B1 | 4/2002 | Denk et al. | 375/232 |
| 6,397,318 B1 | 5/2002 | Peh | 711/220 |
| 6,412,081 B1 | 6/2002 | Koscal et al. | 714/34 |
| 6,434,020 B1 | 8/2002 | Lambert et al. | 363/17 |
| 6,487,654 B1 | 11/2002 | Dowling | 712/244 |
| 6,523,108 B1 | 2/2003 | James et al. | 712/224 |
| 6,552,625 B1 | 4/2003 | Bowling | 332/109 |
| 6,564,238 B1 | 5/2003 | Kim et al. | 708/513 |
| 6,633,970 B1 | 10/2003 | Clift et al. | 712/217 |
| 6,643,150 B1 | 11/2003 | Kawakami | 363/41 |
| 6,658,578 B1 | 12/2003 | Laurenti et al. | 713/324 |
| 6,681,280 B1 | 1/2004 | Miyake et al. | 710/261 |
| 6,694,398 B1 | 2/2004 | Zhao et al. | 710/260 |
| 6,724,169 B1 | 4/2004 | Majumdar et al. | 318/811 |
| 6,728,856 B1 | 4/2004 | Grosbach et al. | 711/202 |
| 6,751,742 B1 * | 6/2004 | Duhault et al. | 713/323 |
| 6,763,478 B1 * | 7/2004 | Bui | 713/600 |
| 2002/0194466 A1 | 12/2002 | Catherwood et al. | 712/241 |
| 2003/0093656 A1 | 5/2003 | Masse et al. | 712/241 |
| 2004/0150439 A1 | 8/2004 | Greenfield | 327/131 |

OTHER PUBLICATIONS

Intel, Pentium Processor Family Developer's Manual, vol. 3: Architrecture and Programming Manual, , pp. 3–1, 3–2, 3–15, 14–1 to 14–30, 18–7, and 25–289 to 25–292, 1995.

Intel, Embedded Intel486 Processor Family Developer's Manual, pp. 2–2, 3–17, 3–37, 4–5, 4–6, 10–1 to 10–12, 12–1 to 12–10, Oct. 1997.

Moore, M "Z80 Family Interrupt Structure". Barleywood (online), retrieved from the internet <URL: http://www-.gaby.de/z80/1653.htm>, 1997.

PCT Search Report based on PCT/US02/16706, 6 pages, Mailed Sep. 27, 2002.

PCT Search Report based on PCT/US02/16705, 7 pages, Mailed Sep. 9, 2002.

PCT Search Report based on PCT/US02/16921, 4 pages, Mailed Oct. 18, 2002.

SPARC, International, Inc., "The SPARC Architecture Manual", Version 8, pp 1–303, 1992.

Weaver, et al., SPARC International, Inc. "The SPARC Architecture Manual", Version 9, pp. xiv, 137, 146–147, 200–204, 221–222, 234–236, 299, 1994–2000.

Free On–Line Dictionary of Computing (FOLDOC). htp://wombat.doc.ic.ac.uk/foldoc/ Search term: program counter, 1995.

* cited by examiner

DEVICE OPERATING POWER MODES

| MODE | LIT. | CPU CLOCK SOURCE | PERIP. CLOCK SOURCE |
|---|---|---|---|
| RUN | 001 | DERIVED FOR PRI. OSC. | DERIVED FOR PRI. OSC. |
| RC-RUN | 010 | LOW PWR. INTERNAL RC | LOW PWR. INTERNAL RC |
| SEC-RUN | 011 | DERIVED FOR SEC. OSC. | DERIVED FOR SEC. OSC. |
| SLEEP | 100 | DISABLED | DISABLED |
| RC-IDLE | 110 | DISABLED | LOW PWR. INTERNAL RC |
| IDLE | 111 | DISABLED | DERIVED FOR PRI. OSC. |
|  |  |  |  |

FIG. 5

REDUCED POWER OPTION

BACKGROUND OF THE INVENTION

1. Field of the Invention

The present invention relates to processors and methods for instruction processing and, more particularly, to processors and methods for power mode instruction processing, pursuant to which a generic instruction is used to control the various power saving modes in the device based on a literal value, such as a 3-bit literal associated with the power mode instruction.

2. Description of the Prior Art

Processors, including microprocessors, digital signal processors and microcontrollers, operate by running software programs that are embodied in one or more series of instructions stored in a memory. The processors run the software by fetching instructions from the series of instructions, decoding the instructions and executing them. The processors run the software by fetching instructions from the series of instructions, decoding the instructions and executing the instructions. Processors, including digital signal processors, are conventionally adept at processing instructions that perform power saving. In general, power saving is achieved through specific instructions, which perform one function and one function only. Typically, the power save instruction performs a single function. For example, you may have a wait instruction, which will turn off the clocks to the CPU core, but keep the clocks to the peripherals going and another instruction called sleep, which would perhaps turn the clocks off to everything. These power save instructions make inefficient use of processor resources and do not provide flexibility to perform power save operations.

There is a need for a new method of implementing power mode instructions within a processor that can control the sleep mode entered efficiently. There is a further need for a new method of implementing a power mode instruction that initiate a switch to the clock source configuration based on a literal value, such as a 3-bit literal, associated with the power mode instruction. There is also a need turn off power to peripheral modules on an individual basis prior to entering a sleep mode. There is a need for a processor that performs power mode instruction processing, pursuant to which a generic instruction is used to control the various power saving modes in the device based on a literal value, such as a 3-bit literal, associated with the power mode instruction.

SUMMARY OF THE INVENTION

According to embodiments of the present invention, a method and a processor for processing a power mode instruction are provided. The power mode instruction itself includes up to five different sleep modes and one run mode, each for initiating a clock source change or inhibit. This instruction may be executed in one processor cycle and with one power mode instruction employing clock transition logic within the processor to initiate a switch to the clock source configuration specified by a literal, such as a 3-bit literal.

A method of processing power mode instruction according to an embodiment of the present invention includes fetching and decoding a power mode instruction. The power mode instruction may be executed on a combination of a CPU clock source and a peripheral clock source. The instruction initiates a switch to the clock source configuration that matches a literal, such as a 3-bit literal.

In an embodiment of the present invention, the power mode instruction may be executed as a first power mode instruction. The first power mode instruction derives the CPU clock source and the peripheral clock source from a primary oscillator. Alternatively, the power mode instruction may be a second power mode instruction. The second power mode instruction derives the CPU clock source and the peripheral clock source from a low power internal RC. Alternatively, the power mode instruction may be a third power mode instruction. The third power mode instruction derives the CPU clock source and the peripheral clock source from a secondary oscillator. Alternatively, the power mode instruction may be a fourth power mode instruction. The fourth power mode instruction disables the CPU clock source and the peripheral clock source. Alternatively, the power mode instruction may be a fifth power mode instruction. The fifth power mode instruction disables the CPU clock source and derives the peripheral clock source from a low power internal RC. Alternatively, the power mode instruction may be a sixth power mode instruction. The sixth power mode instruction disables the CPU clock source and derives the peripheral clock source from a primary oscillator.

In an embodiment of the present invention, the method further includes detecting that an interrupt condition has occurred and loading the first instruction of an interrupt service routine into an instruction register for execution. Alternatively, the method further includes detecting that an interrupt condition has occurred and loading an instruction immediately following the power mode instruction into an instruction register for execution, wherein the power mode instruction disables the CPU clock source.

According to an embodiment of the present invention, a processor for performing power mode instruction processing includes a clock transition logic for initiating a switch to a clock source configuration specified by a literall and a program memory for storing instructions including a power mode instruction. The processor further includes s program counter for identifying current instructions for processing.

BRIEF DESCRIPTION OF THE DRAWINGS

The above described features and advantages of the present invention will be more fully appreciated with reference to the detailed description and appended figures in which: The above described features and advantages of the present invention will be more fully appreciated with reference to the detailed description and appended figures in which:

FIG. 5 depicts a table of processor power modes defined by a literal according to embodiments of the present invention.

DETAILED DESCRIPTION OF THE INVENTION

According to the present invention, a method and processor for processing a power mode instruction are provided. More particularly, a method for processing power mode instruction according to an embodiment of the present invention includes fetching and decoding a power mode instruction. The power mode instruction may be executed on a combination of a CPU clock source and a peripheral clock source. The power mode instruction itself includes up to five different sleep modes and one run mode, each for initiating a clock source change or inhibit. This instruction may be executed in one processor cycle and with one power mode instruction employing clock transition logic within the processor to initiate a switch to the clock source configuration specified by a literal.

Figure 1:
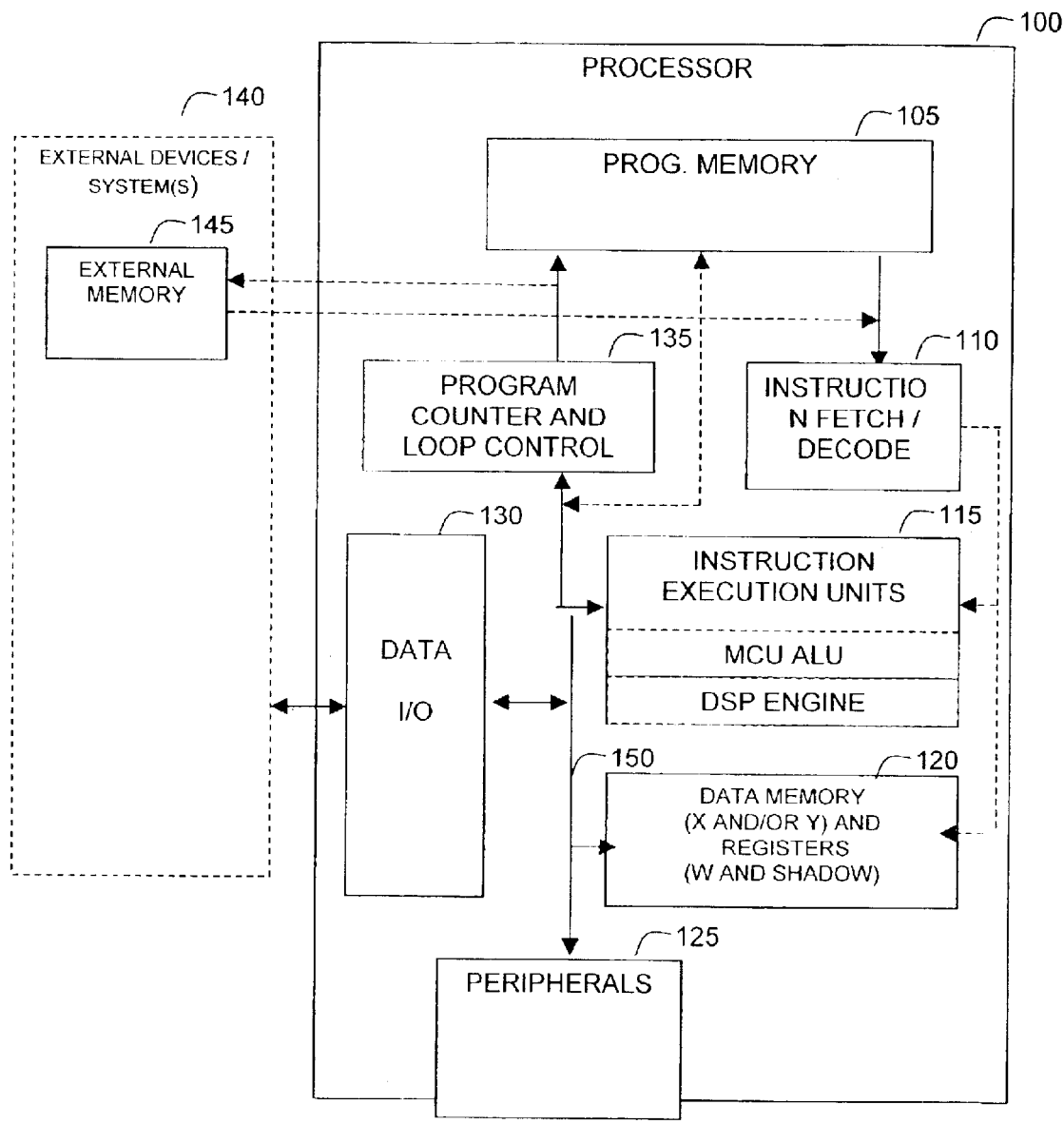
FIG. 1 depicts a functional block diagram of an embodiment of a processor chip within which embodiments of the present invention may find application.
Figure 2:
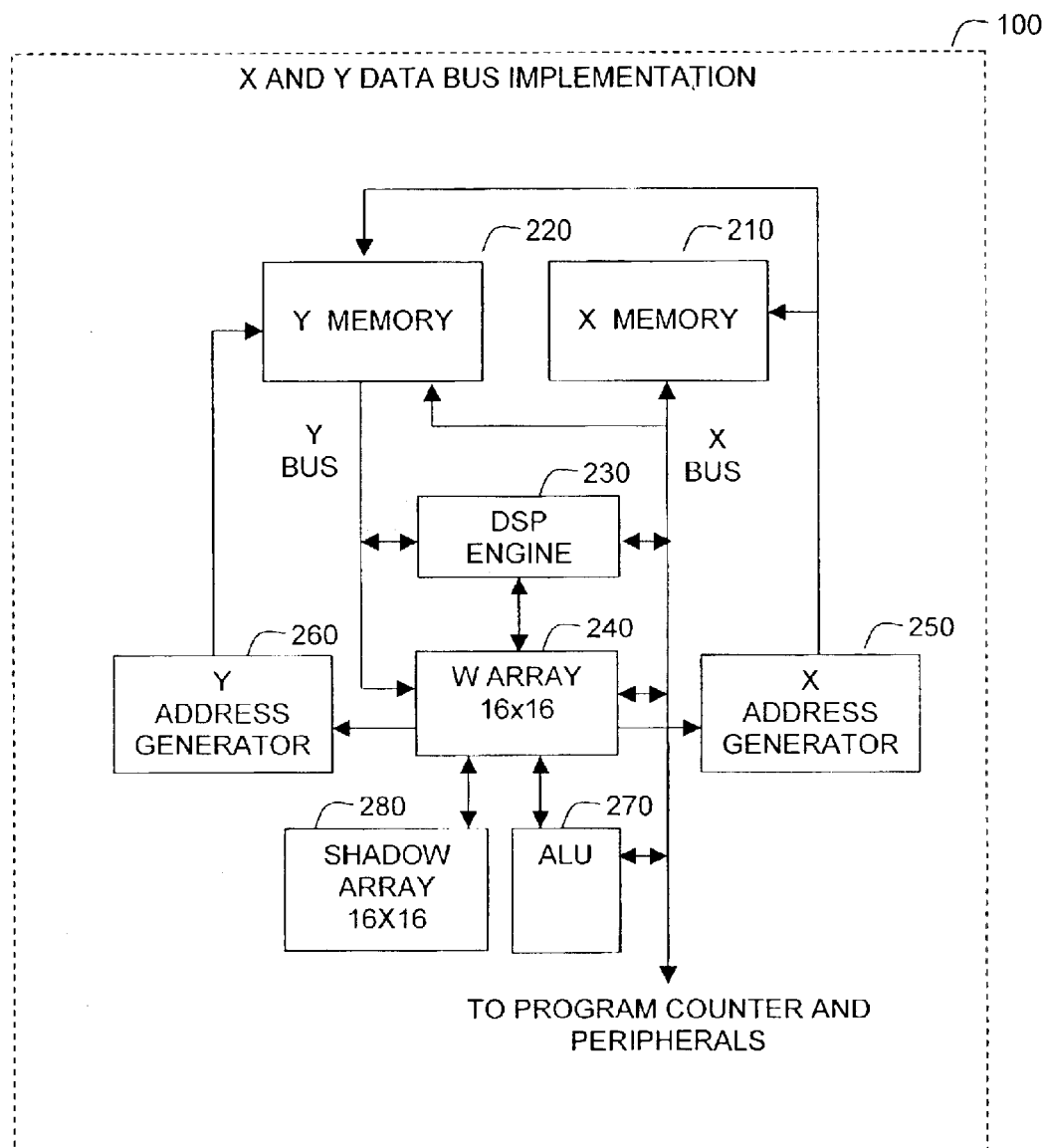
FIG. 2 depicts a functional block diagram of a data busing scheme for use in a processor, which has a microcontroller and a digital signal processing engine, within which embodiments of the present invention may find application.

In order to describe embodiments of power mode instruction processing, an overview of pertinent processor elements is first presented with reference to FIGS. 1 and 2. The power mode instruction and instruction processing is then described more fully with reference to FIGS. 3–5.

Overview of Processor Elements

FIG. 1 depicts a functional block diagram of an embodiment of a processor chip within which the present invention may find application. Referring to FIG. 1, a processor 100 is coupled to external devices/systems 140. The processor 100 may be any type of processor including, for example, a digital signal processor (DSP), a microprocessor, a microcontroller or combinations thereof. The external devices 140 may be any type of systems or devices including input/output devices such as keyboards, displays, speakers, microphones, memory, or other systems which may or may not include processors. Moreover, the processor 100 and the external devices 140 may together comprise a stand alone system.

The processor 100 includes a program memory 105, an instruction fetch/decode unit 110, instruction execution units 115, data memory and registers 120, peripherals 125, data I/O 130, and a program counter and loop control unit 135. The bus 150, which may include one or more common buses, communicates data between the units as shown.

The program memory 105 stores software embodied in program instructions for execution by the processor 100. The program memory 105 may comprise any type of nonvolatile memory such as a read only memory (ROM), a programmable read only memory (PROM), an electrically programmable or an electrically programmable and erasable read only memory (EPROM or EEPROM) or flash memory. In addition, the program memory 105 may be supplemented with external nonvolatile memory 145 as shown to increase the complexity of software available to the processor 100. Alternatively, the program memory may be volatile memory which receives program instructions from, for example, an external non-volatile memory 145. When the program memory 105 is nonvolatile memory, the program memory may be programmed at the time of manufacturing the processor 100 or prior to or during implementation of the processor 100 within a system. In the latter scenario, the processor 100 may be programmed through a process called in-line serial programming.

The instruction fetch/decode unit 110 is coupled to the program memory 105, the instruction execution units 115 and the data memory 120. Coupled to the program memory 105 and the bus 150 is the program counter and loop control unit 135. The instruction fetch/decode unit 110 fetches the instructions from the program memory 105 specified by the address value contained in the program counter 135. The instruction fetch/decode unit 110 then decodes the fetched instructions and sends the decoded instructions to the appropriate execution unit 115. The instruction fetch/decode unit 110 may also send operand information including addresses of data to the data memory 120 and to functional elements that access the registers.

The program counter and loop control unit 135 includes a program counter register (not shown) which stores an address of the next instruction to be fetched. During normal instruction processing, the program counter register may be incremented to cause sequential instructions to be fetched. Alternatively, the program counter value may be altered by loading a new value into it via the bus 150. The new value may be derived based on decoding and executing a flow control instruction such as, for example, a branch instruction. In addition, the loop control portion of the program counter and loop control unit 135 may be used to provide repeat instruction processing and repeat loop control as further described below.

The instruction execution units 115 receive the decoded instructions from the instruction fetch/decode unit 110 and thereafter execute the decoded instructions. As part of this process, the execution units may retrieve one or two operands via the bus 150 and store the result into a register or memory location within the data memory 120. The execution units may include an arithmetic logic unit (ALU) such as those typically found in a microcontroller. The execution units may also include a digital signal processing engine, a floating point processor, an integer processor or any other convenient execution unit. A preferred embodiment of the execution units and their interaction with the bus 150, which may include one or more buses, is presented in more detail below with reference to FIG. 2.

The data memory and registers 120 are volatile memory and are used to store data used and generated by the execution units. The data memory 120 and program memory 105 are preferably separate memories for storing data and program instructions respectively. This format is a known generally as a Harvard architecture. It is noted, however, that according to the present invention, the architecture may be a Von-Neuman architecture or a modified Harvard architecture which permits the use of some program space for data space. A dotted line is shown, for example, connecting the program memory 105 to the bus 150. This path may include logic for aligning data reads from program space such as, for example, during table reads from program space to data memory 120.

Referring again to FIG. 1, a plurality of peripherals 125 on the processor may be coupled to the bus 150. The peripherals may include, for example, analog to digital converters, timers, bus interfaces and protocols such as, for example, the controller area network (CAN) protocol or the Universal Serial Bus (USB) protocol and other peripherals. The peripherals exchange data over the bus 150 with the other units.

The data I/O unit 130 may include transceivers and other logic for interfacing with the external devices/systems 140. The data I/O unit 130 may further include functionality to permit in circuit serial programming of the Program memory through the data I/O unit 130.

FIG. 2 depicts a functional block diagram of a data busing scheme for use in a processor 100, such as that shown in FIG. 1, which has an integrated microcontroller arithmetic logic unit (ALU) 270 and a digital signal processing (DSP) engine 230. This configuration may be used to integrate DSP functionality to an existing microcontroller core. Referring to FIG. 2, the data memory 120 of FIG. 1 is implemented as two separate memories: an X-memory 210 and a Y-memory 220, each being respectively addressable by an X-address generator 250 and a Y-address generator 260. The X-address generator may also permit addressing the Y-memory space thus making the data space appear like a single contiguous memory space when addressed from the X address generator. The bus 150 may be implemented as two buses, one for each of the X and Y memory, to permit simultaneous fetching of data from the X and Y memories.

The W registers 240 are general purpose address and/or data registers. In order to preserve data information contained in W registers 240, while processing affecting flow control is performed, the data information contained in the W registers 240 may be saved to an array of shadow registers 280. After the processing affecting flow control is performed, the data information contained in the shadow register 280 may be restored to the primary registers, thus permitting processing using the data information to resume. The W registers 240 are communicatively coupled to shadow registers 280, where each bit in the array of primary registers 240 is in communication with a bit in the array of shadow registers 280.

The DSP engine 230 is coupled to both the X and Y memory buses and to the W registers 240. The DSP engine 230 may simultaneously fetch data from each the X and Y memory, execute instructions which operate on the simultaneously fetched data and write the result to an accumulator (not shown) and write a prior result to X or Y memory or to the W registers 240 within a single processor cycle.

In one embodiment, the ALU 270 may be coupled only to the X memory bus and may only fetch data from the X bus. However, the X and Y memories 210 and 220 may be addressed as a single memory space by the X address generator in order to make the data memory segregation transparent to the ALU 270. The memory locations within the X and Y memories may be addressed by values stored in the W registers 240.

Any processor clocking scheme may be implemented for fetching and executing instructions. A specific example follows, however, to illustrate an embodiment of the present invention. Each instruction cycle is comprised of four Q clock cycles Q1–Q4. The four phase Q cycles provide timing signals to coordinate the decode, read, process data and write data portions of each instruction cycle.

According to one embodiment of the processor 100, the processor 100 concurrently performs two operations—it fetches the next instruction and executes the present instruction. Accordingly, the two processes occur simultaneously. The following sequence of events may comprise, for example, the fetch instruction cycle:

| | |
|---|---|
| Q1: | Fetch Instruction |
| Q2: | Fetch Instruction |
| Q3: | Fetch Instruction |
| Q4: | Latch Instruction into prefetch register, Increment PC |

The following sequence of events may comprise, for example, the execute instruction cycle for a single operand instruction:

| | |
|---|---|
| Q1: | latch instruction into IR, decode and determine addresses of operand data |
| Q2: | fetch operand |
| Q3: | execute function specified by instruction and calculate destination address for data |
| Q4: | write result to destination |

The following sequence of events may comprise, for example, the execute instruction cycle for a dual operand instruction using a data pre-fetch mechanism. These instructions pre-fetch the dual operands simultaneously from the X and Y data memories and store them into registers specified in the instruction. They simultaneously allow instruction execution on the operands fetched during the previous cycle.

| | |
|---|---|
| Q1: | latch instruction into IR, decode and determine addresses of operand data |
| Q2: | pre-fetch operands into specified registers, execute operation in instruction |
| Q3: | execute operation in instruction, calculate destination address for data |
| Q4: | complete execution, write result to destination |

Power Mode Instruction Processing

Figure 3:
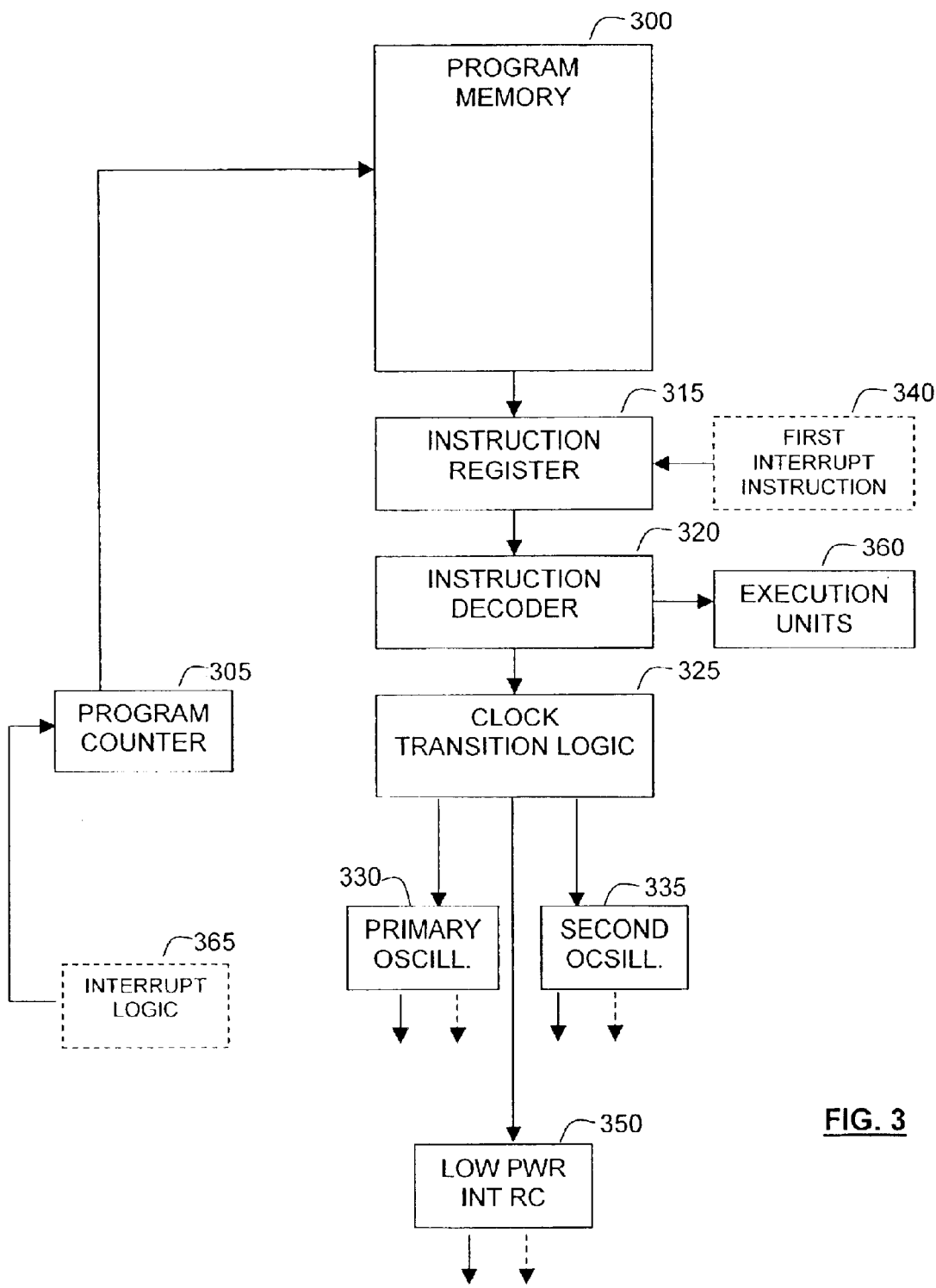
FIG. 3 depicts a functional block diagram of a processor configuration for processing power mode instructions according to embodiments of the present invention.

FIG. 3 depicts a functional block diagram of a processor configuration for processing power mode instructions according to embodiments of the present invention.

Referring to FIG. 3, the processor includes a program memory 300 for storing instructions, such as a power mode. The processor also includes a program counter 305 that stores a pointer to the next program instruction to be fetched. The processor further includes an instruction register 315 for storing an instruction for execution that has been fetched from the program memory 300. The processor also includes an instruction decoder 320 and clock transition logic 325. The clock transition logic 325 switches to the clock source configuration that matches a literal, such as 3-bit literal.

The instruction decoder 320 decodes instructions that are stored in the instruction register 315. Based on the bits in the instruction, the instruction decoder 320 selectively activates clock transition logic 325 for performing the specified operation on a combination of a CPU clock source and a peripheral clock source. The clock sources include a primary oscillator 330, a secondary oscillator 335, a low powered internal RC 350. Each of the clock sources may supply power to the CPU and peripherals in accordance with a 3-bit leteral specified by the instruction. In this regard, when a power mode instruction, in accordance with a 3-bit literal depicted in FIG. 5, is presented to the instruction decoder 320, the instruction decoder generates control signals which cause the clock transition logic 325 to configure the clock sources to match the mode represented by the literals, such as a 3-bit literal.

The clock transition logic 325 may include a register, which includes a plurality of bits and a clock transition bit. The register can be written to manually, such as by a user, with data bits or can fetch an operand that will cause the clock transition logic to switch from one clock source to another clock source. The actual clock source options can be controlled employing the processor by writing to the register. Execution of a power mode instruction fetches the operand and load the operand into the transition logic 325. Writing the bits and the operand before you execute the Power Mode instruction represents the exit state from the instruction.

At any time during the processing of an instruction by the processor, an interrupt condition may occur and be serviced as determined by interrupt logic 365. When an interrupt is serviced, program counter 350 loads into the program counter 350 the address of interrupt service routine instructions for the interrupt condition.

Figure 4A:
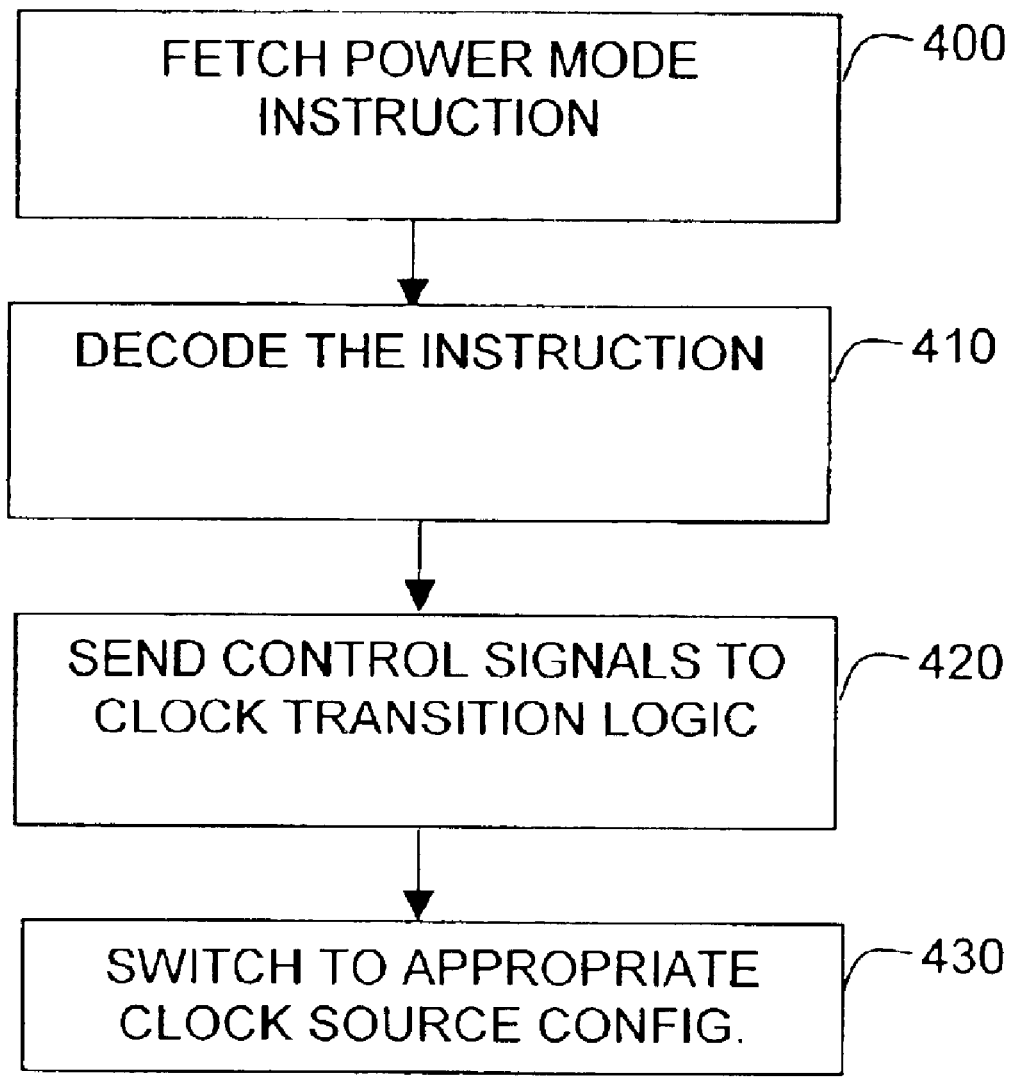
FIG. 4 depict a method of processing power mode instructions according to embodiments of the present invention.

FIG. 4A depicts a method of processing a power mode instruction according to embodiments of the present invention. Referring to FIG. 4A, in step 400A, the processor fetches a power mode instruction from the program memory 300. Then in step 410A, the instruction decoder 320 decodes the instruction. In step 420A, the processor causes control signals to be sent to the clock transition logic 325. In step 430A, the processor executes the power mode instruction to switch the clock sources to the appropriate configuration in accordance with the decoded power mode instruction.

Figure 4B:
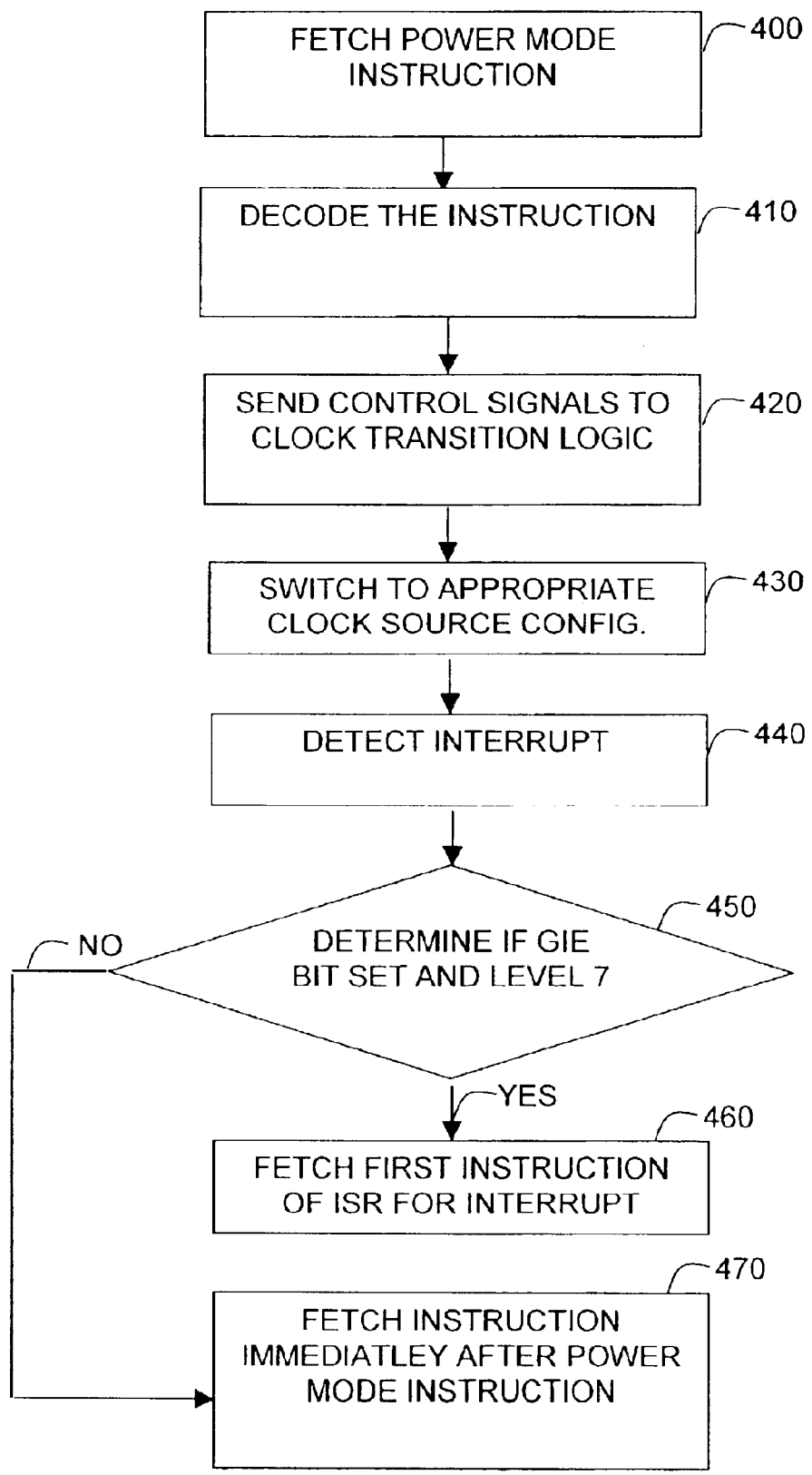

FIG. 4B depicts a method of processing a power mode instruction according to embodiments of the present invention. Referring to FIG. 4B, in step 400B, the processor fetches a power mode instruction from the program memory 300. Then in step 410B, the instruction decoder 320 decodes the instruction. In step 420B, the processor causes control signals to be sent to the clock transition logic 325. In step 430B, the processor executes the power mode instruction to switch the clock sources to the appropriate configuration in accordance with the decoded power mode instruction. in step 440B, an interrupt condition is detected. In step 450, the processor determines whether the interrupt is a level 7 interrupt and whether the GIE bit is set, such as with a value of 1. If the GIE bit is set and the interrupt is a level 7 interrupt, the method proceed to step 460 where the interrupt is serviced and the first instruction of the ISR is fetched. If either of the conditions are not met, then the process goes to step 470, where the instruction immediately following the power mode instruction is fetched.

While specific embodiments of the present invention have been illustrated and described, it will be understood by those having ordinary skill in the art that changes may be made to those embodiments without departing from the spirit and scope of the invention.

What is claimed is:

1. A method of processing power mode instruction, comprising:
    fetching and decoding a power mode instruction; and
    executing the power mode instruction on a combination of a CPU clock source and a peripheral clock source, wherein the power mode instruction initiates a switch to a clock source configuration associated with a literal.

2. The method according to claim 1, wherein the power mode instruction is a first power mode instruction.

3. The method according to claim 2, wherein the clock source configuration for the first power mode instruction corresponds to the CPU clock source and the peripheral clock source derived from a primary oscillator.

4. The method according to claim 1, wherein the power mode instruction is a second power mode instruction.

5. The method according to claim 4, wherein the clock source configuration for the second power mode instruction corresponds to the CPU clock source and the peripheral clock source derived from a low power internal RC.

6. The method according to claim 1, wherein the power mode instruction is a third power mode instruction.

7. The method according to claim 6, wherein the clock source configuration for the second power mode instruction corresponds to the CPU clock source and the peripheral clock source derived from a secondary oscillator.

8. The method according to claim 1, wherein the power mode instruction is a fourth power mode instruction.

9. The method according to claim 8, wherein the clock source configuration for the second power mode instruction corresponds to disabling the CPU clock source and the peripheral clock source.

10. The method according to claim 1, wherein the power mode instruction is a fifth power mode instruction.

11. The method according to claim 10, wherein the clock source configuration for the second power mode instruction corresponds to disabling the CPU clock source and deriving the peripheral clock source from a low power internal RC.

12. The method according to claim 1, wherein the power mode instruction is a sixth power mode instruction.

13. The method according to claim 1, wherein the clock source configuration for the second power mode instruction corresponds to disabling the CPU clock source and deriving the peripheral clock source from a secondary oscillator.

14. The method according to claim 1, further comprising:
    detecting that an interrupt condition has occurred.

15. The method according to claim 14, further comprising:
    loading an instruction immediately following the power mode instruction into an instruction register for execution.

16. The method according to claim 14, further comprising:
    loading the first instruction in an interrupt service routine for the interrupt into an instruction register for execution.

17. The method according to claim 14, further comprising:
    determining whether to service an interrupt associated with the interrupt condition based on CPU priority.

18. A processor for performing a power mode instruction, comprising:
    a program memory for storing instructions including a shadow register array control instruction;
    a program counter for identifying current instructions for processing; and
    a clock transition logic for executing the power mode instruction on a combination of a CPU clock source and a peripheral clock source, wherein the power mode instruction initiates a switch to a clock source configuration associated with a literal.

19. The processor according to claim 18, wherein the power mode instruction is a first power mode instruction.

20. The processor according to claim 19, wherein the clock source configuration for the first power mode instruction corresponds to the CPU clock source and the peripheral clock source derived from a primary oscillator.

21. The processor according to claim 18, wherein the power mode instruction is a second power mode instruction.

22. The processor according to claim 21, wherein the clock source configuration for the second power mode instruction corresponds to the CPU clock source and the peripheral clock source derived from a low power internal RC.

23. The processor according to claim 18, wherein the power mode instruction is a third power mode instruction.

24. The processor according to claim 23, wherein the clock source configuration for the second power mode instruction corresponds to the CPU clock source and the peripheral clock source derived from a secondary oscillator.

25. The processor according to claim 18, wherein the power mode instruction is a fourth power mode instruction.

26. The processor according to claim 25, wherein the clock source configuration for the second power mode instruction corresponds to disabling the CPU clock source and the peripheral clock source.

27. The processor according to claim 18, wherein the power mode instruction is a fifth power mode instruction.

28. The processor according to claim 27, wherein the clock source configuration for the second power mode instruction corresponds to disabling the CPU clock source and deriving the peripheral clock source from a low power internal RC.

29. The processor according to claim 18, wherein the power mode instruction is a sixth power mode instruction.

30. The processor according to claim 29, wherein the clock source configuration for the second power mode instruction corresponds to disabling the CPU clock source and deriving the peripheral clock source from a secondary oscillator.

31. The processor according to claim 18, further comprising:

interrupt logic for detecting that an interrupt condition has occurred.

32. The processor according to claim 31, further comprising:

an instruction register for loading an instruction immediately following the power mode instruction into an instruction register for execution interrupt service routine (ISR) for an interrupt servicing the interrupt condition.

33. The processor according to claim 31, further comprising:

an instruction register for loading the first instruction in an interrupt service routine for the interrupt into an instruction register for execution.

* * * * *